United States Patent
Traudt

(10) Patent No.: US 6,328,647 B1
(45) Date of Patent: Dec. 11, 2001

(54) PRESSURE DIFFERENTIAL DETECTING SYSTEM, AND METHOD OF USE

(76) Inventor: Jon E. Traudt, 3316 Augusta Ave., Omaha, NE (US) 68144

( * ) Notice: Subject to any disclaimer, the term of this patent is extended or adjusted under 35 U.S.C. 154(b) by 0 days.

(21) Appl. No.: 09/545,114

(22) Filed: Apr. 6, 2000

(51) Int. Cl.⁷ .................................................... F24F 11/00
(52) U.S. Cl. .............................. 454/255; 73/705; 73/715; 73/728
(58) Field of Search ................................... 454/238, 255; 73/705, 715, 728; 200/83 A

(56) References Cited

U.S. PATENT DOCUMENTS

| | | | |
|---|---|---|---|
| 2,788,664 | * | 4/1957 | Coulbourn et al. . |
| 3,718,047 | * | 2/1973 | Nakagawa et al. . |
| 4,031,847 | | 6/1977 | Sullivan ................................. 116/65 |
| 4,101,747 | * | 7/1978 | Hould ................................ 200/83 A |
| 4,176,557 | | 12/1979 | Johnston ................................ 73/708 |
| 4,189,724 | | 2/1980 | Onuma et al. ........................ 340/607 |
| 4,370,890 | | 2/1983 | Frick ..................................... 73/718 |
| 4,464,936 | * | 8/1984 | McIntire et al. ....................... 73/705 |
| 5,003,865 | | 4/1991 | Traudt . |
| 5,088,329 | | 2/1992 | Sahagen ................................ 73/727 |
| 5,131,887 | | 7/1992 | Traudt ................................... 454/255 |
| 5,271,277 | | 12/1993 | Pandorf ................................. 73/724 |
| 5,481,919 | * | 1/1996 | Brandt, Jr. ........................ 73/705 X |
| 5,798,462 | * | 8/1998 | Briefer et al. ..................... 73/728 X |

OTHER PUBLICATIONS

Product Information For Henry G. Dietz Co., Model LPS 100–5, Pressure Transducer.

* cited by examiner

*Primary Examiner*—Harold Joyce

(57) ABSTRACT

A differential pressure detecting system having a compliant first chamber, which is contained within a second environment, in combination with a sensor system for monitoring change in volume/shape of the compliant first chamber. In use the internal volume of the compliant first chamber is caused to access a first environment, so that pressure differences between the first and second environments can be detected via monitoring of change in volume/shape of the compliant first chamber. The compliant first chamber expands when the pressure therein is greater than that in the second environment, but does not expand, or decreases if already expanded, when the pressure in the second environment is equal to or greater than that inside the compliant first chamber. The detector system can be of any functional type that does not significantly affect the compliant first chamber volume/shape by its interrogation thereof in developing a signal.

27 Claims, 3 Drawing Sheets

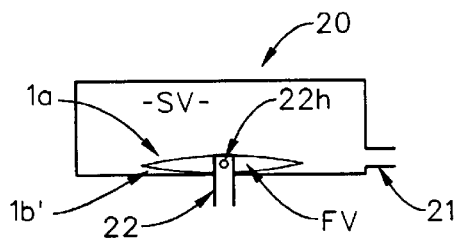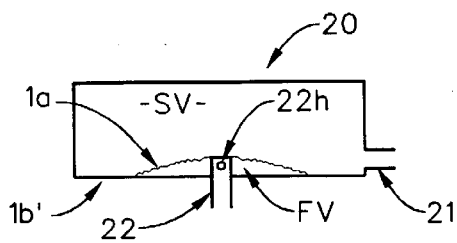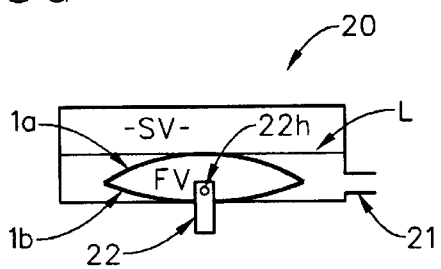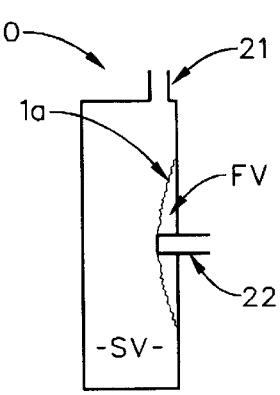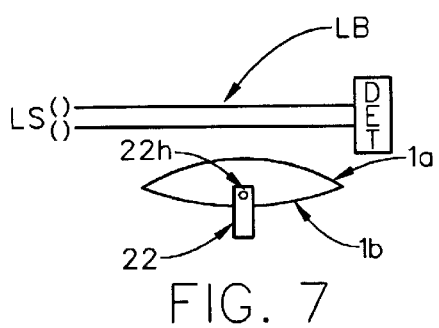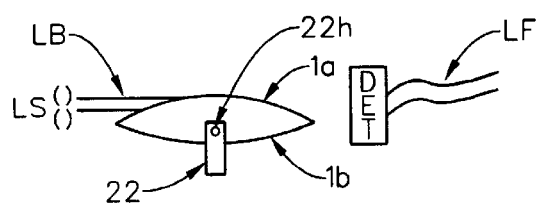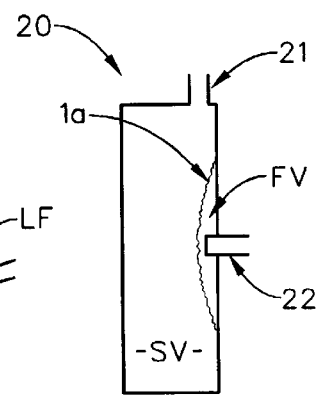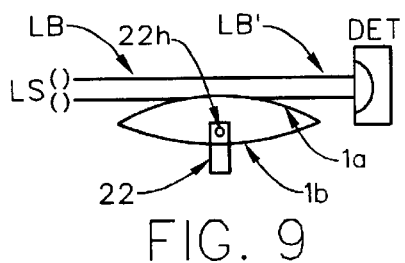

PRESSURE DIFFERENTIAL DETECTING SYSTEM, AND METHOD OF USE

TECHNICAL FIELD

The present invention relates to pressure differential monitoring/transducer systems for monitoring very small pressure differentials, and more particularly to a differential pressure detecting system comprised of a first environment accessing substantially compliant first chamber contained within a second environment, or within a second environment accessing substantially rigid second chamber; said differential pressure detecting system being in combination with a sensor means for monitoring change in volume/shape of said substantially compliant first chamber without significantly affecting said volume/shape. In use the internal volume of said substantially compliant first chamber is caused to access a first environment so that pressure differences between said first and second environments can be detected via monitoring of change in volume/shape of the substantially compliant first chamber.

BACKGROUND

U.S. Pat. Nos. 5,003,865 and 5,131,887 to Traudt, titled "Pressure Controlled Fresh Air Supply Ventilation System Using Soil Gas Pressure As A Reference, And Method Of Use" describe a particularly relevant, although non-limiting, application for the present invention system. Said 865 and 887 Patents are incorporated by reference herein as they provide insight to the utility provided by the present invention system in a ventilation system for air pressure control in an enclosed space. As general interest, it is noted that the 865 and 887 Patents describe a ventilation system which utilizes soil gas pressure below an enclosed space as a reference pressure, to which enclosed space inside air pressure is compared by the system, during operation. The inlet supply air into the enclosed space is controlled by a device based upon an initial user set value, which set level of supply air, under normal conditions, then adjusted by ventilation system action to counteract changes in a signal derived by comparison of said soil gas pressure and inside enclosed space air pressure, by a differential pressure detecting device. While the 865 and 887 Patents describe utility providing systems, it has become apparent that a more accurate, reliable and economical differential pressure detecting device would optimize their operation.

Additionally, said 865 and 887 Patents further disclose that the quality of air in enclosed spaces such as houses and other buildings is subject in an Environmental Protection Agency Report titled "EPA Report to Congress on Indoor Air Quality", released Aug. 4, 1989. In that report reference is made to the so called "Sick Building Syndrome" and a program of increased research and information dissemination regarding the dangers of poor indoor air quality is recommended. Health effects attributed to air contaminants accumulating in poorly ventilated houses and other buildings range from eye, ear, nose and throat irritation, to full scale respiratory and neurological diseases, genetic mutations and cancer. Contaminants such as radon, asbestos, tobacco smoke, formaldehyde, volatile organic compounds, chlorinated solvents, biological contaminants and pesticides etc., and the synergistic effects of multiple contaminants are cited as causes of health problems. The report suggests that reducing the sources of contaminants is the most direct and dependable option in overcoming the problem, and that while air cleaning equipment can compliment air quality improvement, there is no substitute for providing an adequate supply of fresh air into an enclosed space.

Further, said 865 and 887 Patents disclose that in recent years, the high cost of energy has led many people to strive to make their houses and buildings more tightly sealed, hence, in combination with the use of insulation, more energy efficient. Said efforts have included sealing cracks and other air leaks in their houses or buildings to prevent heated or cooled air from escaping, and outside air which requires heating or cooling, from randomly entering at an excessive rate. In effect, such houses and buildings become, to various degrees, closed systems. In such structures the fresh air supply rate is often reduced to far below the American Society of Heating, Refrigeration and Air Conditioning Engineers presently recommended fresh air inlet volume flow rate of 15 Cubic Feet per Minute (CFM) per inhabitant, or 35% air changes per hour, whichever is greater, (see ASHRAE Standard 62-1989). The result of an insufficient fresh air supply into, and stale air removal from such tight enclosed spaces is that contaminants accumulate inside same to dangerous health affecting levels. To emphasize this point, it is estimated by some health care researchers that presently two persons per hour, in the United States alone, contract lung cancer as a result of contact with radon in poorly ventilated houses and other buildings.

A search of existing Patents during preparation of the 865 and 887 Patents showed that numerous inventors have proposed systems, and methods of their use, which provide controlled ventilation to enclosed spaces such as houses and buildings. The various approaches basically utilize a means to cause air flow, such as a motor driven blower, to cause air to move into and stale air to move out of an enclosed space. The fresh air volume supply rate is typically, but not necessarily in the most basic schemes, controlled based upon signals developed by sensing air pressure differences between the inside and the outside of a house or building, from signals derived from sensed rates of air flows in various parts of a system, or by sensing the velocity of the wind outside the house or building.

The most basic schemes simply provide a large fresh air supply into a house or building sufficient to raise the air pressure inside the house or building to a large positive value with respect to that outside the house or building. In such a scheme the fresh air supply must be large enough to maintain the large positive pressure difference no matter what active or passive exhaust air flows develop. As an example, operating a clothes dryer or fireplace will actively exhaust air from a house, and opening a door to the outside of the house or building can passively increase exhaust air. The problem with such simple large excessive positive pressure systems is that they are wasteful of energy. The large volume of fresh air which flows into a house or building equipped with such a system must be heated or cooled at times. As a very large fresh air supply rate is not necessary to keep contaminant concentration levels low enough for health maintenance reasons, there is no valid reason to provide it to a tight house or building.

It should now be obvious that ventilation in buildings and houses etc. should be carefully controlled so that an adequate oxygen supply is assured, contaminants in the air are filtered out, and excess air leakage into and out of enclosed spaces is minimized. To do so, however, requires a precise means for monitoring pressure differences between the enclosed space and a reference pressure such as outdoor air pressure or soil gas pressure. The present invention differential pressure detecting system precisely monitors the pressure difference between first and second environments.

While the said 865 and 887 Patents provided a ventilation control system which identifies and utilizes a pressure reference, (which is compared to air pressure in an enclosed space controlled environment), so a signal can be derived and variation in the signal can be used to control the fresh air supply rate into, and stale air exhaust rate out of an enclosed space controlled environment, a need remains for a reliable and economical differential pressure detecting system for monitoring very small pressure differentials between first and second environments. A Search of Patents for systems somehow relevant to that of the present invention has identified a Sullivan, U.S. Pat. No. 4,031,847 which describes an improvement for responding to reversal in the sense of the ratio between two pressures. In a housing there is located a generally cup-shaped indicator element of resilient, air inpenetratable material including a slack diaphragm having a central area of augmented visibility and an integral tongue projecting obliquely therefrom. The diaphragm is self-biased in either of two positions, in one of which the tongue conceals the central area, and in the other of which the tongue exposes the central area. Pressures to be compared are applied on opposite sides of the diaphragm, with said diaphragm being observable through an observation window. Patents which describe capacitance based transducer systems are U.S. Pat. No. 4,370,890 to Frick; U.S. Pat. No. 5,271,277 to Pandorf; and U.S. Pat. No. 4,176,557 to Johnston. A Patent describing a piezoelectric pressure transducer is U.S. Pat. No. 5,088,329 to Sahagen. Patent to Onuma et al., U.S. Pat. No. 4,189,724 which describes a restriction indicator which comprises a contactless photo-inturrupter switch device including light emitting, and light receiving devices.

Also disclosed, as it is known, is a pressure transducer manufactured by the Henry G. Dietz Co., Model LPS 100. It is capable of activating gold coated contacts in the presence of 0.005 inches of mercury.

The present invention responds to a need for a more reliable and economical differential pressure detecting system than is known in the marketplace, for monitoring very small pressure differentials between first and second environments with a system which can be applied in essentially any setting wherein it is desired to accurately monitor a differential in pressure between first and second environments.

DISCLOSURE OF THE INVENTION

The present invention system is a differential pressure detecting system. Demonstrative applications of the present invention system include:

Monitoring air pressure in an enclosed space and responding to decreases therein to prevent water vapor from entering walls thereof, leading to general deterioration such as fungus and mold growth therein;

Monitoring air pressure in an enclosed space and responding to decreases therein to prevent water vapor, particulate matter, germs and the like from entering thereinto, such as in hospital room settings;

Monitoring air pressure in an enclosed space above a slab on the ground, and responding to decreases therein to prevent soil gas, (eg. radon), from entering thereinto;

Monitoring air pressure in an enclosed space as compared to outside air pressure prior to lighting a fireplace therein, and making indoor air pressure equal to or greater than outside air pressure so that chimney backdrafting can be avoided;

Monitoring the change in air pressure in a building which results from the opening of a door or window etc. to identify a burglary in progress. This application might involve use of multiple signal developing units in a logic circuit so that false alarms are minimized.

The preferred embodiment of the present invention system is primarily:

a differential pressure detecting system for monitoring very low pressure differentials between first and second environments, and comprises a substantially compliant first chamber contained within a substantially rigid second chamber, with volumes within said substantially compliant first chamber and substantially rigid second chamber accessing, via first and second access means, respectively, said first and second environments, respectively. The operational principal of the present invention system is that when the pressure in the substantially rigid second chamber, (outside the substantially compliant first chamber), is less than that inside said substantially compliant first chamber, said substantially compliant first chamber volume expands. But when the pressure in the substantially rigid second chamber, (outside the substantially compliant first chamber), is equal to or greater than that inside said substantially compliant first chamber, said substantially compliant first chamber volume does not expand, or if previously expanded, decreases. For emphasis, when pressure in the present invention substantially compliant first chamber and the pressure in the substantially rigid second chamber are equal, the volume of the substantially compliant first chamber does not expand, or if previously expanded decreases because of the weight of the material from which the substantially compliant first chamber is constructed. (This is considered an important attribute of the present invention). Said system for detecting pressure difference between first and second environments further comprises a detector system means for effectively monitoring change in the volume/shape of said substantially compliant first chamber. Importantly, it is noted that in the preferred embodiment, the application of said detector system has negligible effect on the volume/shape of said substantially compliant first chamber. (This also is considered an important attribute of the present invention).

Preferred present invention system construction provides that said substantially compliant first chamber is made substantially of mylar. Operational devices have been made utilizing one-one-thousanth ($1/1000$) inch thick sheets of mylar cut into circles of between six (6) and eighteen (18) inches in diameter, which sheets are joined at the circumferential outer edges to form a "balloon"-like structure, however, the outer edge shape of a present invention system can be of any functional shape. Preferred present invention systems provide that two sheets of mylar, (or functional equivalent), each presenting with an area of between about twenty-eight (28) and one-hundred-fourteen (114) square inches, have said first access means extending into the volume, (formed between said two sheets of mylar, or functional equivalent, by their being interconnected at circumferential edges), to a distance of between essentially zero (0.0) and one-and-one-half (1.5) inch. An alternative version of the present invention provides for a single sheet of mylar, (or functional equivalent), which is attached at its circumference to a rigid base. A folded and/or loosely mounted area of such mylar, (or functional equivalent), material is beneficial in this embodiment. It is noted that the described operational devices can measure pressure differentials on the order of one (1.0) Pascal (ie. 0.003 to 0.004 inch of water column), because the balloon material is very thin and because the balloon volume/shape detector system does not affect the "balloon" volume/shape when interrogating it to develop a signal. It is noted that the present ivnention is applicable to monitoring pressures which can be termed "very low" or "extremely low".

Further, a preferred present invention system embodiment provides that the first access means, which extends into the volume within said substantially compliant first chamber, be essentially tubular in shape and have hole(s) present through walls thereof. The reason the hole(s) is/are present through the walls is because, in use, a mylar sheet, (or functional equivalent), across from the oppositely positioned first essentially tubular access means, can come to rest atop the open end thereof and block small flow of gas into or out thereof. The hole(s) through the wall ensure unobstructed flow of gas no matter the orientation of the present invention system at any given time. (This is yet another attribute of the present invention which is considered very important).

Where a present invention differential pressure monitoring system is utilized to monitor pressure differentials between first and second environments, at least one of which is/are displaced some distance away from the location of the differential pressure monitoring system, at least one of said first and second access means can comprise a length of tubing between said access means and the monitored environment.

The detecting system means in the present invention system for monitoring pressure differential between first and second environments can comprise a source of, and detector of electromagnetic radiation arranged so that the amount of electromagnetic radiation received from said source thereof which arrives at, and is detected by the detector thereof is dependent on the volume/shape of said substantially compliant first chamber. The detector system means can optionally include a length of fiber optics which pipes electromagnetic radiation to a remote location whereat it can be visually observed or otherwise monitored. Further, said detector system means for effectively monitoring change in the volume/shape of said substantially compliant first chamber can comprise a plurality of detector elements, and monitoring the elements thereof which detect presence and intensity of electromagnetic radiation, can serve to indicate the status of the present invention differential pressure detecting system and, hence, difference between monitored first and second environment pressures.

An alternative detector system for effectively monitoring change in the volume/shape of said substantially compliant first chamber can comprise a source, and detector of sound waves arranged so that the amount of sound waves received from said source thereof which arrives at, and is detected by the detector thereof, is dependent on the volume/shape of said substantially compliant first chamber. The source and detector can be a combined unit.

Further, regardless of the type of detector system means for effectively monitoring change in the volume/shape of said substantially compliant first chamber, said detector can provide a means for sounding an alarm when said volume/shape of said substantially compliant first chamber falls outside some acceptable range. And, said alarm sounding system can be comprised of a plurality of present invention differential pressure detecting system for monitoring pressure differential between first and second environments, wherein the alarm is triggered only, for instance, where multiple alarm signals are developed, (eg. as exemplified by two (2) out of four (4) logic, as is utilized in nuclear power plant control systems), to minimize false alarms. Such an alarm system is particularly appropriate for application in burglary detection systems which sound an alarm when air pressure inside an enclosed space (eg. house of building), suddenly changes because of unauthorized entry thereinto.

A specific application of a present invention differential pressure detecting system for monitoring pressure differential between first and second environments is in a ventilation system for use in a house or building. Where, for instance, prevention of radon gas entry into said house or building is a goal and the house or building sets upon a foundation atop of underlying soil, said house or building can be equipped with a heating and air conditioning system comprised of a cold air return, a blower fan and a high efficiency particulate filter. Additionally, the ventilation system can comprise, in combination with the heating and air conditioning system, a series combination of a prefilter and an inlet air blower, which prefilter and inlet air blower are attached to one another by way of a common duct, which common duct, at one end thereof, has access to the atmosphere outside the house or building, and which common duct, at the other end thereof, attaches to the cold air return of the heating and air conditioning system of the house or building. Further, the house or building heating and air conditioning system can be fashioned such that essentially all air entering the cold air return passes through the high efficiency particulate filter and is caused by the blower fan of the heating and air conditioning system to circulate through the house or building and either leave through an opening in the house or building, such as an open door or window or by way of an exhaust fan, or return to the cold air return. The ventilation system can further comprise a present invention differential pressure detecting system for monitoring pressure differential between first and second environments, which monitors the air pressure inside the house or building and also monitors soil gas pressure beneath the foundation of the house or building without significantly altering said soil gas pressure. Monitored pressure differential can be caused to provide a signal which is dependent on, (eg. proportional to), the difference between the two identified pressures, and said signal can be used to regulate the operation of the inlet air blower so as to increase air volume flow rate when the air pressure in the house or building is at a level, when compared to the soil gas pressure, lower than a user selected level, so that the air pressure inside the house or building is increased, and to again operate at a reduced air volume flow rate when the air pressure inside the house or building is at, or above, the user selected level with respect to the soil gas pressure. And, as recited above, it is to be understood that the present invention pressure differential monitoring sensor comprises a differential pressure detecting system for monitoring pressure difference between first and second environments comprising a substantially compliant first chamber contained within a substantially rigid second chamber, volumes within said substantially compliant first chamber and substantially rigid second chamber being accessed by first and second access means, respectively, said first and second access means accessing, in use, said first and second environments, respectively.

The above recited specific application of a present invention differential pressure detecting system for monitoring pressure differential between first and second environments can, of course, be configured so that instead of monitoring soil gas pressure, pressure in an enclosed space environment and some other reference environment, such as an environment in another enclosed space or outside an enclosed space is monitored. The environments monitored might be, for instance, rooms in a hospital wherein it is necessary to keep one room at an elevated pressure so that particulate matter and germs etc. do not diffuse thereinto.

A method of detecting pressure differential between first and second environments can be recited as comprising the steps of:

a. providing a differential pressure detecting system for monitoring pressure differential between first and second environments as generally described above, wherein said differential pressure detecting system comprises a substantially compliant first chamber contained within a selection from the group consisting of:
   a second environment accessing substantially rigid second chamber; and
   a surrounding second environment;
   a volume within said substantially compliant first chamber being accessed by a first access means, said first access means accessing, in use, said first environment;
   such that when the pressure in the selection from the group consisting of:
   a second environment accessing substantially rigid second chamber; and
   a surrounding second environment;
   is less than that in said substantially compliant first chamber, said substantially compliant first chamber volume expands, and such that when the pressure in the selection from the group consisting of:
   a second environment accessing substantially rigid second chamber; and
   a surrounding second environment;
   is equal to or greater than that in said substantially compliant first chamber, said substantially compliant first chamber volume does not expand, or if previously expanded, decreases;
   said system for monitoring pressure differential between first and second environments further comprising a detector system means for effectively monitoring change in the volume/shape of said substantially compliant first chamber without significantly affecting said volume/shape;
b. causing the volume within said substantially compliant first chamber to access, via said first access means, said first environment; and
c. monitoring output from said detector system means.

It is further noted that testing of very low pressure monitoring sensor systems available in the marketplace has shown sensitivity to providing false alarms in the presence of vibrations, such as those caused by motors turning on and off, or vehicles passing nearby. Further it has been found that calibration settings in existing very low pressure monitoring sensor systems are prone to vary with time. Embodiments of the present invention, particularly those which operate by blocking a light beam when a substantially compliant first chamber volume expands, however, have been found to demonstrate substantial immunity to such effects.

The present invention will be better understood by reference the Detailed Description Section of this Specification, in conjunction with the Drawings.

SUMMARY OF THE INVENTION

It is therefore a primary objective and/or purpose of the present invention to provide a differential pressure detecting system for monitoring pressure difference between first and second environments which comprises a substantially compliant first chamber contained within a selection from the group consisting of:
   a second environment accessing substantially rigid second chamber; and
   a surrounding second environment.

It is another objective and/or purpose of the present invention to provide a differential pressure detecting system for monitoring pressure difference between first and second environments which comprises a detector system means for effectively monitoring change in the volume/shape of said substantially compliant first chamber without significantly affecting said volume/shape.

It is yet another objective and/or purpose of the present invention to provide a differential pressure detecting system for monitoring pressure difference between first and second environments which comprises a first access means for accessing the volume inside said substantially compliant first chamber, which first access means is essentially tubular in shape and has holes present through walls thereof at a location within the volume inside said substantially compliant first chamber.

Other objectives and/or purposes of the present invention will become apparent from a reading of the Specification.

BRIEF DESCRIPTION OF THE DRAWINGS

FIG. 3a shows a side view of a present invention differential pressure detecting system for monitoring pressure difference between first and second environments" in a condition wherein the pressure in the substantially compliant first chamber, ((1a) & (1b)), volume (FV) is lower than that in the substantially rigid second chamber volume (SV).

FIG. 3b shows a side view of a present invention differential pressure detecting system for monitoring pressure difference between first and second environments" in a condition wherein the pressure in the substantially compliant first chamber, ((1a) & (1b')), volume (FV) is lower than that in the substantially rigid second chamber volume (SV).

FIG. 4 shows a side view of a present invention differential pressure detecting system for monitoring pressure difference and/or change between first and second environments" in a condition wherein the pressure in the substantially compliant first chamber, ((1a) & (1b)), volume (FV) is higher than that in the substantially rigid second chamber volume (SV).

FIGS. 5 and 6 show a similar sequence as do FIGS. 3a and 4, but for a present invention "differential pressure detecting system for monitoring pressure difference between first and second environments", mounted such that increased volume in said substantially compliant first chamber, ((1a) & (1b)), causes the surface (1a) thereof to move horizontally.

FIG. 7 shows the substantially compliant first chamber, ((1a) & (1b)), in combination with a source of electromagnetic radiation (LS) and a detector (DET), with a beam of electromagnetic radiation (LB) passing from said source (LS) to said detector (DET).

FIG. 8 shows the substantially compliant first chamber, ((1a) & (1b)) completely blocking the beam of electromagnetic radiation (LB).

FIG. 9 shows the substantially compliant first chamber, ((1a) & (1b)) partially blocking the beam of electromagnetic radiation (LB), so that only a portion thereof (LB') enters into the detector (DET).

DETAILED DESCRIPTION

Figure 1A:
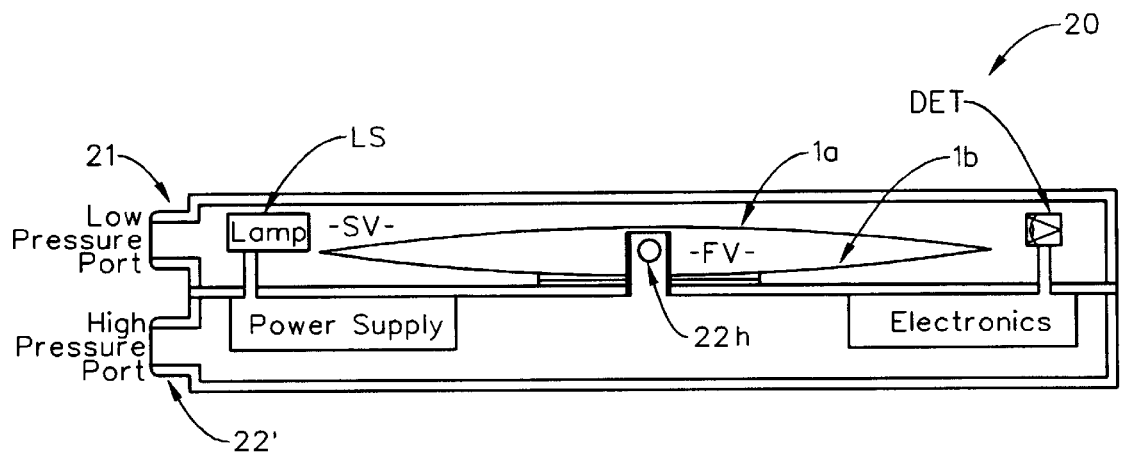
FIG. 1a shows a preferred present invention "differential pressure detecting system for monitoring pressure difference between first and second environments" with a well defined substantially compliant first chamber (FV) volume and substantially rigid second chamber (SV) volume.
Figure 1B:
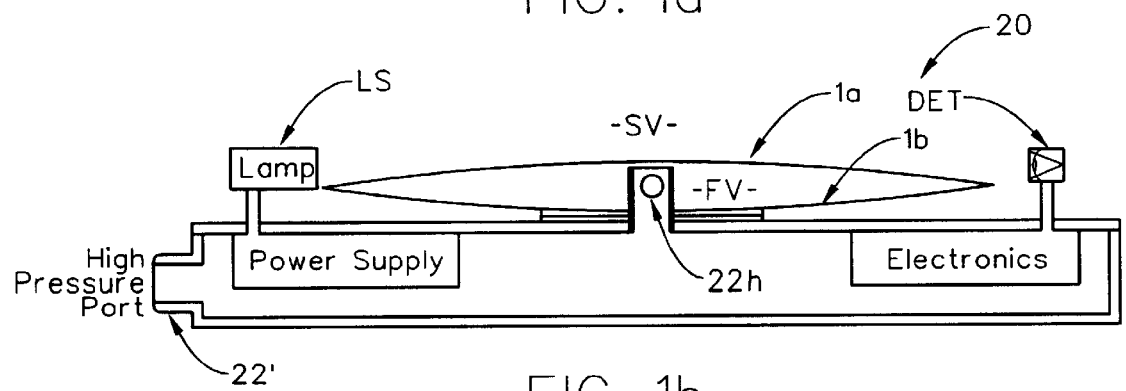
FIG. 1b shows a preferred present invention "differential pressure detecting system for monitoring pressure difference between first and second environments" with a well defined substantially compliant first chamber (FV), but wherein the substantially rigid second chamber (SV) is simply open ambient.

Turning now to FIG. 1a, there is shown a preferred present invention:

"differential pressure detecting system for monitoring pressure difference between first and second environments" (20), comprising a substantially compliant first chamber, (comprised of (1a) & (1b)), contained within a substantially rigid second chamber. Well defined volumes (FV) and (SV) within said substantially compliant first chamber and substantially rigid second chamber, respectively, are accessed by first (22) and second (21) access means, respectively, and said first (22) and second (21) access means provide access, in use, to said monitored first and second environments, respectively. FIG. 1b show a present invention system which is similar to that shown in FIG. 1a, but the volume (SV) in the substantially rigid second chamber is simply open ambient. While this present invention configuration is functional, the substantially compliant first chamber wall (1a) is open to the second environment comprising atmosphere, and can become affected by dust, ambient air motion, and other external forces etc.

Figure 2:
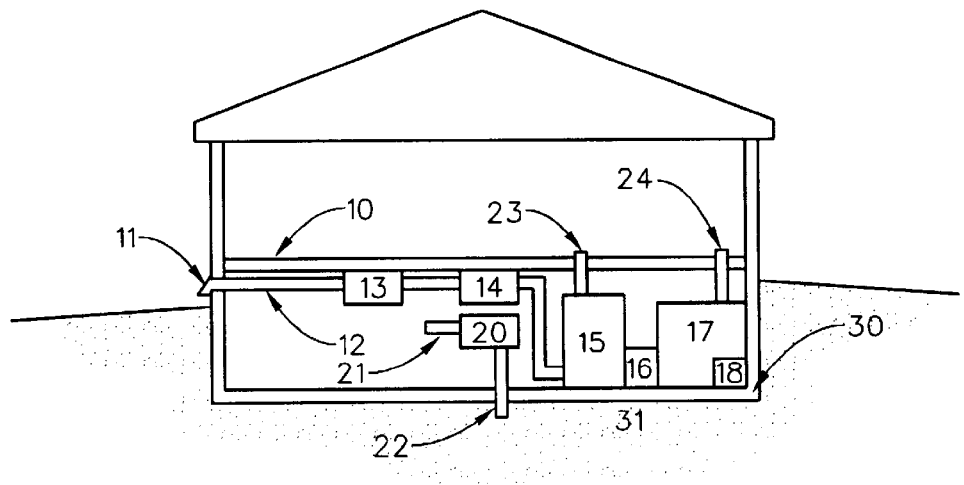
FIG. 2 shows a present invention differential pressure detecting system for monitoring pressure difference and between first and second environments applied in a controlled fresh air flow system.

FIG. 2 shows that in one application, said first environment can be soil gas pressure under a concrete slab (30), and that said second environment can be the volume in a lower level of an enclosed space such as the basement of a house, although alternatively, the pressure differential between two enclosed space environments could be monitored, or the pressure differential between an enclosed space environment and an outside environment could be monitored.

Continuing, FIGS. 1a and 1b also show the presence of a source of electromagnetic radiation (LS) and a Detector (DET) along with optionally self-contained electronics and power supply. It is to be noted that in use, when the substantially compliant first chamber ((1a) & (1b)) changes volume/shape because of a change in pressures in said first and second volumes, it can move so as to block the detector (DET) from receiving all or part of said electromagnetic radiation from the source thereof (LS).

FIG. 3a shows a side view of a present invention differential pressure detecting system for monitoring pressure difference between first and second environments (20), in a condition wherein the pressure in the substantially compliant first chamber, ((1a) & (1b)), volume (FV) is lower than that in the substantially rigid second chamber volume (SV). FIG. 3b shows a side view of a present invention differential pressure detecting system for monitoring pressure difference between first and second environments, much as in FIG. 3a, but wherein the substantially compliant first chamber, wall (1b) is formed from a relatively rigid component rather than a material similar to that from which wall (1a) is made. While the FIG. 3b embodiment is not preferred, it is shown as a possible modification to the preferred embodiment in FIG. 3a to indicate that it is included within the scope of the Claims.

FIG. 4 shows a side view of a present invention differential pressure detecting system for monitoring pressure difference between first and second environments" (20), in a condition wherein the pressure in the substantially compliant first chamber, ((1a) & (1b)), volume (FV) is higher than that in the substantially rigid second chamber volume (SV). Note that the volume (FV) in the substantially compliant first chamber, ((1a) & (1b)), causes the upper surface (1a) thereof to rise. Note that a "line" (L) is shown on the substantially rigid second chamber, which substantially rigid second chamber can be transparent to the eye thereby allowing a user to visually see when a substantially compliant first chamber, ((1a) & (1b)) upper surface (1a) extends thereabove. This configuration allows a very simple means by which a user can detect relative air pressure in one enclosed space, with respect to a relevant second enclosed space.

A functional alternative interpretation of "line" (L) in FIG. 4 is that it represents a barrier located above the substantially compliant first chamber, ((1a) & (1b)), and which prevents the upper surface (1a) from forming a stable dome, such that it would not collapse under its own weight where the pressure inside thereof decreases to become equal to or less than that in the second chamber volume (SV), after forming a dome. The substantially compliant first chamber, ((1a) & (1b)) is free to expand to the point necessary to be detected, (as in FIG. 8 where a light beam (LB) is blocked), but not to the point it forms a stable dome.

FIGS. 5 and 6 show a similar sequence as do FIGS. 3 and 4, but for a present invention "differential pressure detecting system for monitoring pressure difference between first and second environments" (20), mounted such that increased volume in said substantially compliant first chamber, ((1a) & (1b)), causes the surface (1a) thereof to move horizontally. Note that, in the FIGS. 5 and 6 present invention configuration, at least a portion of the upper circumference of the substantially compliant first chamber, ((1a) & (1b)), should be affixed to the inside of the substantially rigid second chamber so that said upper circumference of the substantially compliant first chamber, ((1a) & (1b)) does not fall downward.

FIGS. 7, 8 and 9 are to be dynamically viewed as a group. FIG. 7 shows the substantially compliant first chamber, ((1a) & (1b)), in combination with a source of electromagnetic radiation (LS) and a detector (DET), with a beam of electromagnetic radiation (LB) passing from said source (LS) to said detector (DET). FIG. 8 shows the substantially compliant first chamber, ((1a) & (1b)) completely blocking the beam of electromagnetic radiation (LB), and FIG. 9 shows the substantially compliant first chamber, ((1a) & (1b)) partially blocking the beam of electromagnetic radiation (LB), so that only a portion thereof (LB') enters into the detector (DET). The intensity of the beam of electromagnetic radiation monitored by the detector (DET) is thereby modulated as a function of the volume/shape of the substantially compliant first chamber, ((1a) & (1b)). Note also in FIG. 8, that a fiber optics (LF) is shown. In use it can be applied to direct electromagnetic radiation to a remote location whereat a user can directly, or indirectly, monitor whether or not electromagnetic radiation is being blocked access to the fiber optics by increased volume or changed shape of the substantially compliant first chamber, ((1a) & (1b)).

Figure 10:
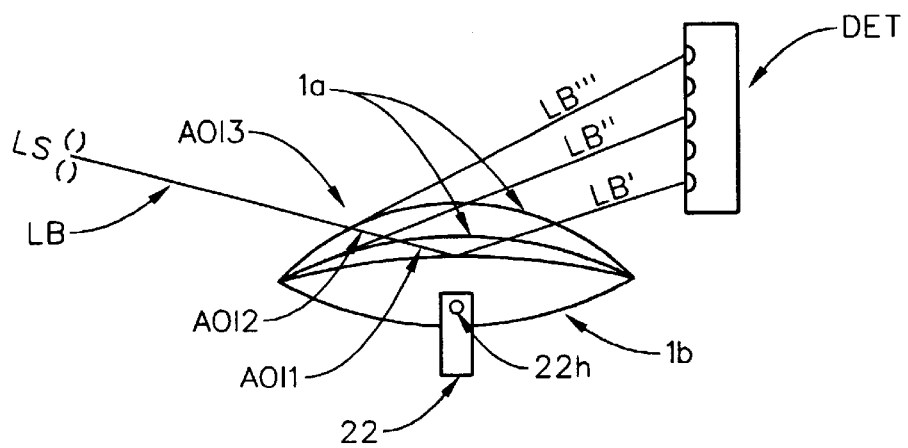
FIG. 10 shows that if a beam of electromagnetic radiation is caused to approach the upper (1a) surface of the substantially compliant first chamber ((1a) & (1b)) at an angle, then as said upper surface (1a) expands upward, the reflected electromagnetic beam, (eg. LB', LB'', LB'''), it can be intercepted by different elements in a multi-element detector system (DET).

FIG. 10 shows that if a beam of electromagnetic radiation is caused to approach the upper (1a) surface of the substantially compliant first chamber ((1a) & (1b)) at an angle, so that as said upper surface (1a) expands upward, the reflected electromagnetic beam, (eg. LB', LB", LB'''), is intercepted by different elements in a multi-element detector system (DET). A changing positive pressure inside the substantially compliant first chamber ((1a) & (1b)), as compared to the pressure inside the substantially rigid second chamber (SV), then can be detected by determining which detector (DET) element produces the largest magnitude output signal.

Figure 11:
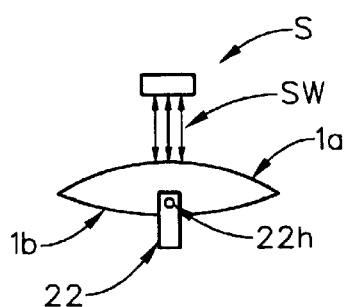
FIG. 11 shows a source/detector of sound (S) which can send sonar-type signals and detected change in position of substantially compliant first chamberwall (1a).

FIG. 11 shows a source/detector of sound (S) which can send and receive sonar-type sound wave (SW) signals so that they reflect off a substantially compliant first chamber wall (1a). As the location of said substantially compliant first chamber wall (1a) changes with its volume/shape, the time it takes the sound waves to emit from sound/detector (S), reflect from substantially compliant first chamber wall (1a), and be detected by sound/detector (S), will change.

Figure 12:
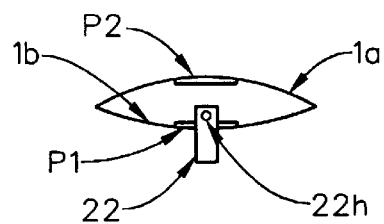
FIG. 12 shows capacitor plates (P1) and (P2) positioned inside a substantially compliant first chamber ((1a) & (1b)), such that when the it expands/decreases in volume/shape the capacitance between the plates (P1) and (P2) will change.

FIG. 12 shows capacitor plates (P1) and (P2) positioned in a substantially compliant first chamber ((1a) & (1b)), such that when the it expands/decreases in volume the distance between the plates, and hence capacitance of a capacitor formed by plates (P1) and (P2), will change. This embodiment likely requires AC capacitance detection to prevent charge build-up on the plates, which charge build-up causes a spurious force to develop therebetween which is not directly indicative of the monitored pressure differential.

Figure 13:
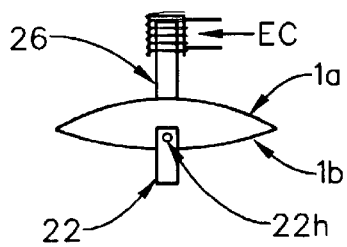
FIG. 13 shows a plunger rod (26) and a coil (EC) changes arranged with respect to a substantially compliant first chamber ((1a) & (1b)), such that when it expands/decreases in volume/shape the coil

FIG. 13 shows a plunger rod (26) and a coil (EC) arranged with respect to a substantially compliant first chamber ((1a) & (1b)), such that when it expands/decreases in volume the inductance of the coil (EC) changes.

Figure 14:
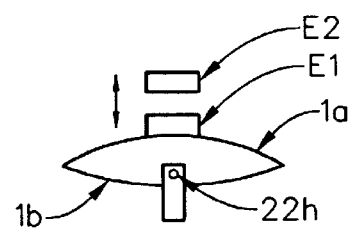
FIG. 14 shows two electrodes (E1) and (E2) arranged with respect to a substantially compliant first chamber (((1a) & (1b)), such that when it expands/decreases in volume/shape the electrodes make and break respective contact.

FIG. 14 shows two electrodes (E1) and (E2) arranged with respect to a substantially compliant first chamber ((1a) & (1b)), such that when it expands/decreases in volume/shape the electrodes make and break, respectively, contact.

It should be appreciated that any detector system that can monitor volume/shape change of the present invention substantially compliant first chamber ((1a) & (1b)) without significantly affecting the measured volume/shape change thereof, can be applied in the present invention. The foregoing specific examples are thus demonstrative and not limiting.

Figure 15:
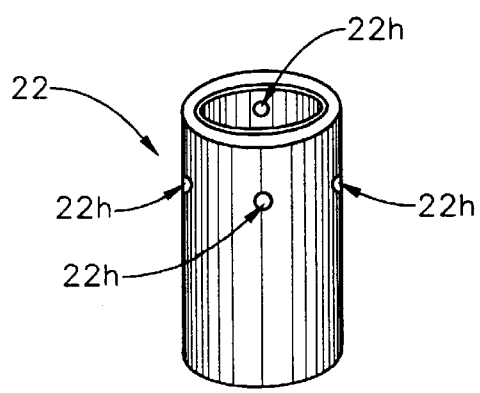
FIG. 15 shows an expanded view of a first access means (22) for accessing the volume (FV) within the substantially compliant first chamber ((1a) & (1b)).

FIG. 15 shows an expanded view of a first access means (22) for accessing the volume (FV) within said substantially compliant first chamber ((1a) & (1b)). Note the holes (22H) in the walls thereof which will allow gas to pass therethrough even if the upper end of the essentially tubular shaped first access means (22) becomes covered by an upper (1a) surface of the substantially compliant first chamber ((1a) & (1b)) as demonstrated in FIGS. 3 and 5. (As very small gas flows are involved during operation of the present invention, (one the order necessary to change pressure in a substantially compliant first chamber ((1a) & (1b)) by, on the order of one (1.0) Pascal (ie. 0.003 to 0.004 inch of water column), it can happen that the weight of an upper surface (1a) of a substantially compliant first chamber ((1a) & (1b)) can block gas flow when a condition as exemplified in FIG. 3 occurs). The presence of said holes (22H) in the first access means (22) is considered an important attribute of the present invention.

Returning now to FIG. 2, it should be appreciated that it further shows that the present invention differential pressure detecting system for monitoring pressure difference between first and second environments (20) can be applied in a controlled fresh air flow system. As demonstration, it is shown that there is an inlet air duct system (12) which enters a house through an outside wall (10). A rain guard or hood (11) is shown protecting the duct system (12) where it enters the house, but said rain guard or hood does not obstruct the entry of air, nor is it a required element in the present invention. The inlet air duct system (12) has integrated therein an air prefilter (13) and a fresh air supply device such as an inlet air blower or air pump, (here-in-after referred to simply as inlet air blower), (14). Typically the duct system (12) will be installed so that it attaches to and opens into the cold air return system (15) of a house heating and/or air conditioning system so that incoming fresh from outside the enclosed space air can be heated or cooled before reaching the occupants. As well, an air filter, typically a high efficiency contaminant removing air filter, (16), (eg. Honeywell Model F50), is placed between the cold air return (15) and the entrance to the furnace and/or air conditioning system (17). Said heating and/or air conditioning system (17) will contain a blower fan (18) which circulates heated or cooled air throughout the house, including the air entered through the fresh air inlet duct system.

In use the blower fan (18) in the furnace and air conditioning system (17) is set to operate at a low constant speed unless the air passing through said blower fan (18) is to be heated or cooled. In that case the blower fan (18) may operate at the speed which is standard when the present invention is not in place. The result, it will be appreciated, is that mixed fresh inlet air and recirculating inside air is continually filtered to remove airbourne contaminants prior to flowing throughout the system of the house or other building. However, when air leaks in the house are sealed, very little air will randomly enter at various unintended locations in the house. The amount will, of course, depend on how many air leaks remain. Inlet air volume inflow rate is thus, very nearly completely, in a very tight house, controlled by the fresh air supply device (14), which can demonstrated as an inlet air blower in the inlet duct system (12).

The fresh air supply device (14) integrated into the present invention inlet fresh air supply system is set to operate at a speed which causes some desired base level of inlet fresh air volume inflow rate to be entered into the cold air return system (15) of the house heating and cooling system continuously, passing through the air filter, (16) typically a high efficiency contaminant removing air filter. This base level of inlet fresh air volume inflow rate is set by a user and can be varied within a certain range. The base level of inlet fresh air volume inflow is set by the occupants of a house so as to provide a healthy environment inside the house under normal conditions, (eg. 15 CFM per occupant or 35% air change per hour or as otherwise necessary to minimize inside air contaminant levels). Under normal conditions fresh air will then enter the house by way of the invention inlet fresh air supply duct system (12), at location (11), and then be filtered by air prefilter (13) and then by the air filter (16), then flow through the house or other building by way of the furnace and/or air conditioning system (17), and then exit the house, typically, through a fireplace chimney, or other natural passive exhaust outlet. However, most houses today have appliances which cause air to be exited from a house when operated. For instance, the typical cloths dryer will exit approximately 100 CFM. A kitchen or bathroom exhaust fan will exit approximately 80 CFM. A Jenn-Aire(tm) Range will exit approximately 240 CFM during operation and a fireplace in which a fire is burning will cause approximately 30 to 120 CFM of air to exit a house. Also shown is a device (20), (note, prior to the development of the present invention a pressure difference or pressure differential monitoring sensor such as Dwyer Instruments Model No. 3000-60PA was utilized), into which tubes (21) and (22), or equivalent pressure location access providing means, are placed. The open end of tube (21) or equivalent is typically, but not necessarily, placed in the basement of the house and the open end of tube (22) or equivalent is placed through a hole in the foundation (30), (note the term "foundation" can refer to the floor of the lowest occupied level of an enclosed space as well), of the house or other building at which position it senses the soil gas pressure. Said hole is then sealed so that the tube (22) or equivalent is tightly gripped and so that soil gas can not escape around the outside of said tube (22) or equivalent. Also shown are a representation of normal house cold air return system elements (15) and (23) and a representation of normal house heated or cooled air circulation elements (24). The preferred embodiment of the present invention typically makes use of said commonly existing elements, thereby making the present invention economical to practice. The soil beneath the house, which provides the soil gas pressure which is sensed by the open end of tube (22) is identified by the numeral (31). The presently discussed application of the present invention differential pressure detecting system for monitoring pressure difference between first and second environments, uses the soil gas pressure as a relatively constant, approximate average atmospheric pressure representing, (soil gas pressure is actually normally slightly above atmospheric pressure), value to which the inside air pressure sensed by the open end of tube (21) or equivalent is compared. The pressure difference or pressure differential monitoring sensor (20) typically produces a signal which is proportional to the difference of the two identified sensed pressures. Said signal is used to control the rate at which inlet fresh air supply device (14) operates. During normal conditions the inlet fresh air supply device (14) will operate to cause the inside air pressure to be equal to, or just in excess of, the soil gas pressure. As the pressure inside the house decreases because of the operation of an appliance exhaust blower etc., the inlet fresh air supply device (14) in the invention inlet air duct system (12) is caused to alter operations so as to cause a greater volume of air to enter the house and thereby cause the inside pressure to again be equal to, or just in excess of, the soil gas pressure. A change in inlet fresh air volume inflow rate into a house or building can be achieved in a fresh air supply device by changing the speed of a blower, the pitch of fan blades, the diversion of air flow or any equivalent means. As this pressure relationship is kept constant by the action of the control system, it will be appreciated that air pressure inside the house or building, can be maintained at a level equal to or greater than, soil gas pressure, (except possibly transitively before the system can react), and hence, very little soil gas, and the radon it contains will enter the house or other building equipped with the system. Also note that during the operation of the fresh air supply device (eg. an inlet air blower) (14), the heating and air conditioning blower fan (18) continues to circulate filtered air within and throughout the house. If the incoming air requires heating or cooling said blower fan (18) may operate at a higher speed if desired by a user, and if not, at a slower speed. The pressure difference or pressure differential monitoring sensor (20) provides a signal to inlet fresh air supply device (14) causing it to speed up or slow down as required to maintain indoor air pressure within a range set by the user.

It should be appreciated that the open end of tube (22) could be caused to monitor other than soil gas pressure. For instance, it could be projected upward through the floor (10) to sense the pressure in the space thereabove. Such a scenario might represent a hospital setting, wherein certain rooms are to be kept at a higher pressure that others to prevent contaminants and germs etc. from entering thereinto. In that light, while a house was primarily used as an example of an application of a present invention differential pressure detecting system for monitoring pressure difference between first and second environments, it is to be understood that any two enclosed space first and second environments can be monitored with the present invention.

It is to be understood that the substantially rigid second chamber can be an enclosure, (see FIG. 1a), which substantially contains the substantially compliant first chamber, or the substantially rigid second chamber can simply comprise the surrounding ambient environment, (see FIG. 1b).

In addition, the terminology "substantially tubular" is to be interpreted broadly to include any functional tubular element for carrying a flow therethrough, whether circular, or of other cross-sectional geometry.

Further, the terminology "volume/shape" is used to indicate that while, in present invention operation, causing a higher pressure to be present inside a substantially compliant first chamber basically leads to its volume expanding, said volume expansion is accompanied by a change in shape of the substantially compliant first chamber. What is actually detected by a present invention detector system, however, is typically more directly related to a change in the shape of the substantially compliant first chamber than it is to the change in its volume.

It is also noted that present invention systems can measure pressure differentials on the order of one (1.0) Pascal (ie. 0.003 to 0.004 inch of water column), because the balloon material is very thin and the balloon volume/shape detector system does not affect the "balloon" volume/shape. The terminology "without significantly affecting said volume/shape" as applied to describe the detector system means operation is to be interpreted in light thereof.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A differential pressure detecting system for monitoring pressure differential between first and second environments, said differential pressure detecting system comprising a substantially compliant first chamber contained within a substantially rigid second chamber, volumes within said substantially compliant first chamber and substantially rigid second chamber being accessed by first and second access means, respectively, said first and second access means accessing, in use, said first and second environments, respectively;

such that when the pressure in the substantially rigid second chamber is less than that in said substantially compliant first chamber, said substantially compliant first chamber volume expands, and such that when the pressure in the substantially rigid second chamber is equal to or greater than that in said substantially compliant first chamber, said substantially compliant first chamber volume does not expand, or if previously expanded, decreases;

said system for monitoring pressure differential between first and second environments further comprising a detector system means for effectively monitoring change in the volume/shape of said substantially compliant first chamber without significantly affecting said volume/shape;

said detector system means being comprised of a source of, and detector of electromagnetic radiation arranged so that the presence and amount of electromagnetic radiation received from said source thereof which arrives at and is detected by the detector is dependent on the volume/shape of said substantially compliant first chamber.

2. A differential pressure detecting system for monitoring pressure differential between first and second environments as in claim 1, in which said substantially compliant first chamber is at least partially made of mylar.

3. A differential pressure detecting system for monitoring pressure differential between first and second environments as in claim 2, in which said mylar comprises two sheets thereof connected together at circumferential edges to form a "balloon".

4. A differential pressure detecting system for monitoring pressure differential between first and second environments as in claim 3, in which said first access means extends into the volume between said two sheets of mylar which are connected together at circumferential edges.

5. A differential pressure detecting system for monitoring pressure differential between first and second environments as in claim 4, in which said two sheets of mylar each present with an area of between twenty-eight (28) and one-hundred-fourteen (114) square inches, and in which said first access means extends into the volume formed between said two sheets of mylar which are connected together at circumferential edges, to a distance of between essentially zero (0.0) and one-and-one-half (1.5) inch.

6. A differential pressure detecting system for monitoring pressure differential between first and second environments as in claim 1, in which said first access means extends into the volume within said substantially compliant first chamber, said first access means being essentially tubular in shape and having holes present through walls thereof at a location within the volume inside said substantially compliant first chamber.

7. A differential pressure detecting system for monitoring pressure differential between first and second environments as in claim 1, in which at least one of said first and second access means comprise(s) a length of tubing between said access means and the monitored environment.

8. A differential pressure detecting system for monitoring pressure differential between first and second environments as in claim 1, in which said detector system means for effectively monitoring change in the volume/shape of said substantially compliant first chamber comprises a length of fiber optics which pipes electromagnetic radiation to a remote location whereat it can be visually observed or entered to a detector system means.

9. A differential pressure detecting system for monitoring pressure differential between first and second environments as in claim 1, in which said detector system means detector for effectively monitoring change in the volume/shape of said substantially compliant first chamber comprises a plurality of detector elements.

10. A differential pressure detecting system for monitoring pressure differential between first and second environments as in claim 1, in which said detector system means for effectively monitoring change in the volume/shape of said substantially compliant first chamber comprises a means for causing an alarm when said volume/shape of said substantially compliant first chamber falls outside a selected criteria.

11. A differential pressure detecting system for monitoring pressure differential between first and second environments as in claim 1, which further comprises a barrier placed with respect to the substantially compliant first chamber to prevent its forming a stable dome shape thus preventing it from collapsing under its own weight when pressure outside thereof decreases to become equal to, from greater than that in said substantially compliant first chamber.

12. A differential pressure detecting system for monitoring pressure differential between first and second environments, said differential pressure detecting system comprising a substantially compliant first chamber surrounded by a second environment, a volume within said substantially compliant first chamber being accessed by a first access means, said first access means accessing, in use, said first environment;

such that when the pressure of the second environment is less than that in said substantially compliant first chamber, said substantially compliant first chamber volume expands, and such that when the pressure in the second environment is equal to or greater than that in said substantially compliant first chamber, said substantially compliant first chamber volume does not expand, or if previously expanded, decreases;

said system for monitoring pressure differential between first and second environments further comprising a detector system means for effectively monitoring change in the volume/shape of said substantially compliant first chamber without significantly affecting said volume/shape;

said detector system means being comprised of a source of, and detector of electromagnetic radiation arranged so that the presence and amount of electromagnetic radiation received from said source thereof which arrives at and is detected by the detector is dependent on the volume/shape of said substantially compliant first chamber.

13. A differential pressure detecting system for monitoring pressure differential between first and second environments as in claim 12, in which said substantially compliant first chamber is at least partially made of mylar.

14. A differential pressure detecting system for monitoring pressure differential between first and second environments as in claim 13, in which said mylar comprises two sheets thereof connected together at circumferential edges to form a "balloon".

15. A differential pressure detecting system for monitoring pressure differential between first and second environments as in claim 14, in which said first access means extends into the volume between said two sheets of mylar which are connected together at circumferential edges.

16. A differential pressure detecting system for monitoring pressure differential between first and second environments as in claim 15, in which said two sheets of mylar each present with an area of between twenty-eight (28) and one-hundred-fourteen (114) square inches, and in which said first access means extends into the volume formed between said two sheets of mylar which are connected together at circumferential edges, to a distance of between essentially zero (0.0) and one-and-one-half (1.5) inch.

17. A differential pressure detecting system for monitoring pressure differential between first and second environments as in claim 12, in which said first access means extends into the volume within said substantially compliant first chamber, said first access means being essentially tubular in shape and having holes present through walls thereof at a location within the volume inside said substantially compliant first chamber.

18. A differential pressure detecting system for monitoring pressure differential between first and second environments as in claim 12, in which said detector system means for effectively monitoring change in the volume/shape of said substantially compliant first chamber comprises a length of fiber optics which pipes electromagnetic radiation to a remote location whereat it can be visually observed or entered to a detector system means.

19. A differential pressure detecting system for monitoring pressure differential between first and second environments as in claim 18, in which said detector system means detector for effectively monitoring change in the volume/shape of said substantially compliant first chamber comprises a plurality of detector elements.

20. A differential pressure detecting system for monitoring pressure differential between first and second environments as in claim 12, in which said detector system means for effectively monitoring change in the volume/shape of said substantially compliant first chamber comprises a means for causing an alarm when said volume/shape of said substantially compliant first chamber falls outside a selected criteria.

21. A differential pressure detecting system for monitoring pressure differential between first and second environments as in claim 12, which further comprises a barrier placed with respect to the substantially compliant first chamber to prevent its forming a stable dome shape thus preventing it from collapsing under its own weight when pressure outside thereof decreases to become equal to, from greater than that in said substantially compliant first chamber.

22. A system comprised of a plurality of differential pressure detecting systems for monitoring pressure differential between first and second environments;

each of said differential pressure detecting systems for monitoring pressure differential between first and second environments comprising:

a substantially compliant first chamber contained within a surrounding second environment, a volume within said substantially compliant first chamber being accessed by a first access means, said first access means accessing, in use, said first environment;

such that when the pressure in surrounding second environment is less than that in said substantially compliant first chamber, said substantially compliant first chamber volume expands, and such that when the pressure in the surrounding second environment is equal to or greater than that in said substantially compliant first chamber, said substantially compliant first chamber volume does not expand, or if previously expanded, decreases;

said system for monitoring pressure differential between first and second environments further comprising a detector system means for effectively monitoring change in the volume/shape of said substantially compliant first chamber without significantly affecting said volume/shape;

each of said detector system means being comprised of a source of, and detector of electromagnetic radiation arranged so that the presence and amount of electromagnetic radiation received from said source thereof which arrives at and is detected by the detector is dependent on the volume/shape of said substantially compliant first chamber;

said plurality of said differential pressure detecting systems for monitoring pressure difference between first and second environments being arranged such that when at least two of said differential pressure detecting systems for monitoring pressure differential between first and second environments detect sufficient change in the volume/shape of its substantially compliant first chamber to indicate alarm, an alarm is caused.

23. A ventilation system for use in a house or building, which house or building sets upon a foundation atop of underlying soil and is equipped with a heating and air conditioning system comprised of a cold air return, a blower fan and a high efficiency particulate filter; which ventilation system comprises, in combination with the heating and air conditioning system, a series combination of a prefilter and an inlet air blower, which prefilter and inlet air blower are attached to one another by way of a common duct, which common duct, at one end thereof, has access to the atmosphere outside the house or building, and which common duct, at the other end thereof, attaches to the cold air return of the heating and air conditioning system of the house or building; which house or building heating and air conditioning system is fashioned such that essentially all air entering the cold air return passes through the high efficiency particulate filter and is caused by the blower fan of the heating and air conditioning system to circulate through the house or building and either leave through an opening in the house or building, such as an open door or window or by way of an exhaust fan, or return to the cold air return; which ventilation system further comprises a pressure difference monitoring sensor, which pressure difference monitoring sensor monitors the air pressure inside the house or building and also monitors soil gas pressure beneath the foundation of the house or building without significantly altering said soil gas pressure; which pressure difference monitoring sensor produces a signal which is proportional to the difference between the two identified pressures, which signal is used to regulate the operation of the inlet air blower so as to increase air volume flow rate when the air pressure in the house or building is at a level, when compared to the soil gas pressure, lower than a user selected level, so that the air pressure inside the house or building is increased, and to again operate at a reduced air volume flow rate when the air pressure inside the house or building is at, or above, the user selected level with respect to the soil gas pressure;

wherein said pressure differential monitoring sensor comprises a differential pressure detecting system for monitoring pressure differential between first and second environments, said differential pressure detecting system comprising a substantially compliant first chamber contained within a selection from the group consisting of:

a second environment accessing substantially rigid second chamber; and a surrounding second environment;

a volume within said substantially compliant first chamber being accessed by a first access means, said first access means accessing, in uEe, said first environment;

such that when the pressure in the selection from the group consisting of:
a second environment accessing substantially rigid second chamber; and
a surrounding second environment;

is less than that in said substantially compliant first chamber, said substantially compliant first chamber volume expands, and such that when the pressure in the selection from the group consisting of:
a second environment accessing substantially rigid second chamber; and
a surrounding second environment;

is equal to or greater than that in said substantially compliant first chamber, said substantially compliant first chamber volume does not expand, or if previously expanded, decreases;

said system for monitoring pressure differential between first and second environments further comprising a detector system means for effectively monitoring change in the volume/shape of said substantially compliant first chamber without significantly affecting said volume/shape.

24. A method of detecting pressure differential between first and second environments comprising the steps of:
a. providing a differential pressure detecting system for monitoring pressure differential between first and second environments comprising a substantially compliant first chamber contained within a selection from the group consisting of:
a second environment accessing substantially rigid second chamber; and
a surrounding second environment;

a volume within said substantially compliant first chamber being accessed by a first access means, said first access means accessing, in use, said first environment;

such that when the pressure in the selection from the group consisting of:
a second environment accessing substantially rigid second chamber; and
a surrounding second environment;

is less than that in said substantially compliant first chamber, said substantially compliant first chamber volume expands, and such that when the pressure in the selection from the group consisting of:
a second environment accessing substantially rigid second chamber; and
a surrounding second environment;

is equal to or greater than that in said substantially compliant first chamber, said substantially compliant first chamber volume does not expand, or if previously expanded, decreases;

said system for monitoring pressure differential between first and second environments further comprising a detector system means for effectively monitoring change in the volume/shape of said substantially compliant first chamber without significantly affecting said volume/shape;

b. causing volumes within said substantially compliant first chamber to access, via said first access means, said first environment;

c. monitoring output from said detector system means.

25. A differential pressure detecting system for monitoring pressure differential between first and second environments, said differential pressure detecting system comprising a substantially compliant first chamber contained within a substantially rigid second chamber, volumes within said substantially compliant first chamber and substantially rigid second chamber being accessed by first and second access means, respectively, said first and second access means accessing, in use, said first and second environments, respectively;

such that when the pressure in the substantially rigid second chamber is less than that in said substantially compliant first chamber, said substantially compliant first chamber volume expands, and such that when the pressure in the substantially rigid second chamber is equal to or greater than that in said substantially compliant first chamber, said substantially compliant first chamber volume does not expand, or if previously expanded, decreases;

said system for monitoring pressure differential between first and second environments further comprising a detector system means for effectively monitoring change in the volume/shape of said substantially compliant first chamber without significantly affecting said volume/shape;

wherein said detector system means for effectively monitoring change in volume/shape of said substantially compliant first chamber comprises a source of, and detector of sound waves arranged so that the amount of sound waves received from said source thereof which arrives at and is detected by the detector thereof is dependent on the volume/shape of said substantially compliant first chamber.

26. A differential pressure detecting system for monitoring pressure differential between first and second environments as in claim 2, in which said mylar comprises one sheet thereof connected at circumferential edging thereof to a rigid means.

27. A differential pressure detecting system for monitoring pressure differential between first and second environments as in claim 13, in which said mylar comprises one sheet thereof connected at circumferential edging thereof to a rigid means.

* * * * *

UNITED STATES PATENT AND TRADEMARK OFFICE
CERTIFICATE OF CORRECTION

PATENT NO.     : 6,328,647 B1
DATED          : December 11, 2001
INVENTOR(S)    : Traudt It is certified that error appears in the above-identified patent and that said Letters Patent is hereby corrected as shown below:

<u>Title page,</u>
Insert: -- *Attorney, Agent or Firm*—James D. Welch --

Signed and Sealed this

Fifth Day of August, 2003

JAMES E. ROGAN
*Director of the United States Patent and Trademark Office*